US011777370B2

(12) United States Patent
Vive et al.

(10) Patent No.: US 11,777,370 B2
(45) Date of Patent: Oct. 3, 2023

(54) TURBOGENERATOR FOR HYBRID ELECTRIC AERONAUTICAL PROPULSION

(71) Applicants: SAFRAN HELICOPTER ENGINES, Bordes (FR); SAFRAN, Paris (FR)

(72) Inventors: Loïs Pierre Denis Vive, Moissy-Cramayel (FR); Christophe Ludovic Jean-Claude Viguier, Moissy-Cramayel (FR)

(73) Assignees: SAFRAN HELICOPTER ENGINES, Bordes (FR); SAFRAN, Paris (FR)

( * ) Notice: Subject to any disclaimer, the term of this patent is extended or adjusted under 35 U.S.C. 154(b) by 28 days.

(21) Appl. No.: 17/597,786

(22) PCT Filed: Jul. 24, 2020

(86) PCT No.: PCT/FR2020/051363
§ 371 (c)(1),
(2) Date: Jan. 24, 2022

(87) PCT Pub. No.: WO2021/019169
PCT Pub. Date: Feb. 4, 2021

(65) Prior Publication Data
US 2022/0286019 A1 Sep. 8, 2022

(30) Foreign Application Priority Data
Jul. 26, 2019 (FR) ...................................... 1908503

(51) Int. Cl.
*H02K 7/18* (2006.01)
*H02K 21/14* (2006.01)
(Continued)

(52) U.S. Cl.
CPC ............ *H02K 7/1823* (2013.01); *B64D 27/02* (2013.01); *B64D 27/10* (2013.01); *B64D 27/24* (2013.01);
(Continued)

(58) Field of Classification Search
CPC ...... H02K 7/1823; H02K 21/14; H02K 21/28; H02K 16/00; H02K 1/06; B64D 27/02;
(Continued)

(56) References Cited

U.S. PATENT DOCUMENTS

2019/0319514 A1* 10/2019 Williams ................ F01D 5/225

FOREIGN PATENT DOCUMENTS

| EP | 2434623 A1 | 3/2012 |
| FR | 2566975 A1 | 1/1986 |
| FR | 2618616 A1 | 1/1989 |

OTHER PUBLICATIONS

French Search Report issued in French Application FR1908503 dated Mar. 24, 2020 (2 pages).
(Continued)

*Primary Examiner* — Joseph Ortega
(74) *Attorney, Agent, or Firm* — Bookoff McAndrews, PLLC

(57) ABSTRACT

An aeronautical turbogenerator for hybrid electric propulsion includes a heat engine and an electrical generator coupled mechanically to the heat engine and including a rotor and a stator, the rotor extending in an axial direction and including a common magnetized rotor yoke comprising a plurality of permanent magnets defining at least three axially distributed movable annular rings, the stator including a magnetic stator yoke comprising a plurality of electrical windings defining axially and/or circumferentially distributed stationary sectors, at least two stationary sectors, one of which covers axially at least two movable annular rings, being arranged angularly so as not to mutually coincide and thus deliver at least two distinct and independent voltage levels.

10 Claims, 3 Drawing Sheets

(51) Int. Cl.
*F02C 6/20* (2006.01)
*B64D 27/24* (2006.01)
*B64D 27/10* (2006.01)
*B64D 27/02* (2006.01)

(52) U.S. Cl.
CPC ............... *F02C 6/20* (2013.01); *H02K 21/14* (2013.01); *B64D 2027/026* (2013.01); *F05D 2220/76* (2013.01)

(58) Field of Classification Search
CPC .. B64D 27/10; B64D 27/24; B64D 2027/026; F02C 6/20; F05D 2220/76; Y02T 50/60
See application file for complete search history.

(56) References Cited

OTHER PUBLICATIONS

International Search Report and Written Opinion issued in International Application PCT/FR2020/051363 dated Sep. 10, 2020 (13 pages).

\* cited by examiner

[Fig. 1]
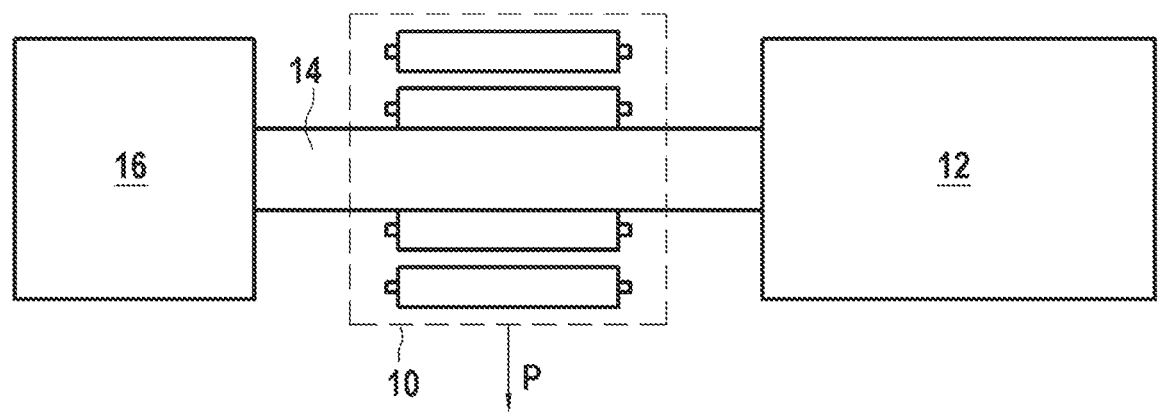
[Fig. 2]
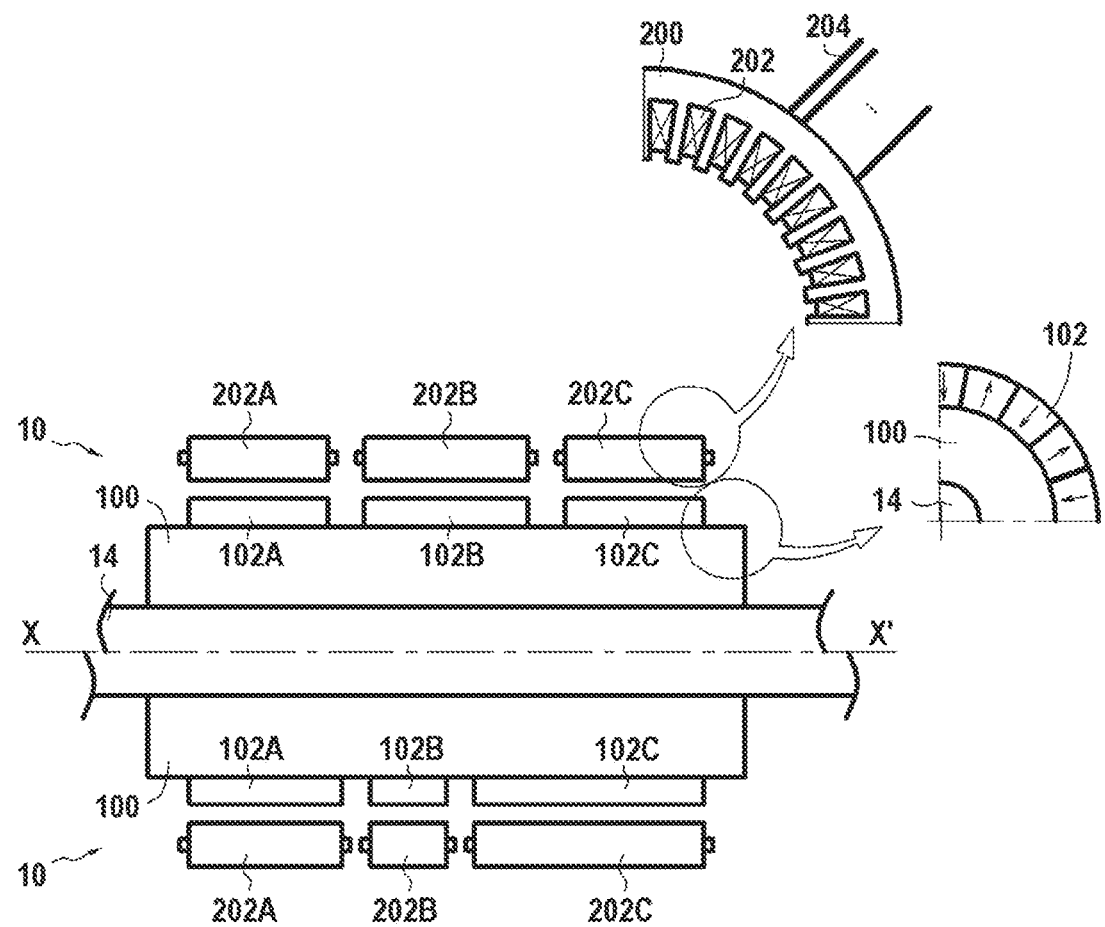

[Fig. 3]
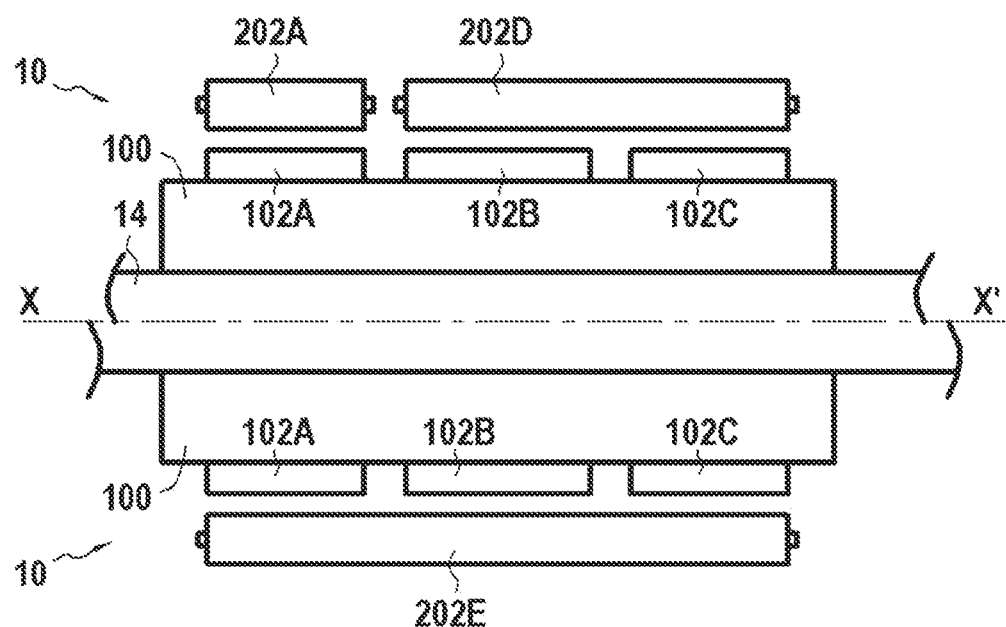
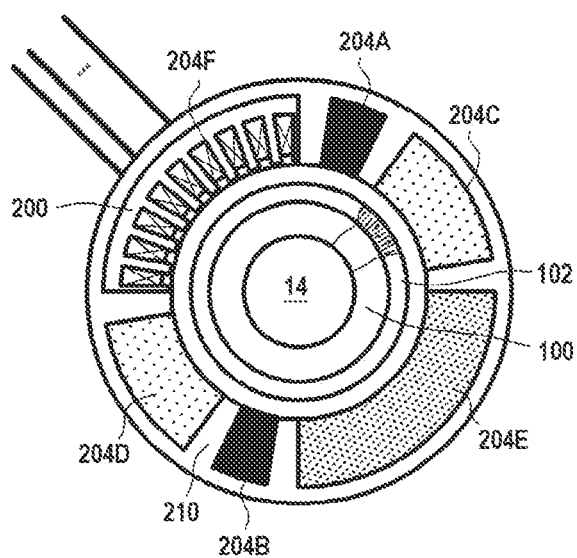
Fig. 4A
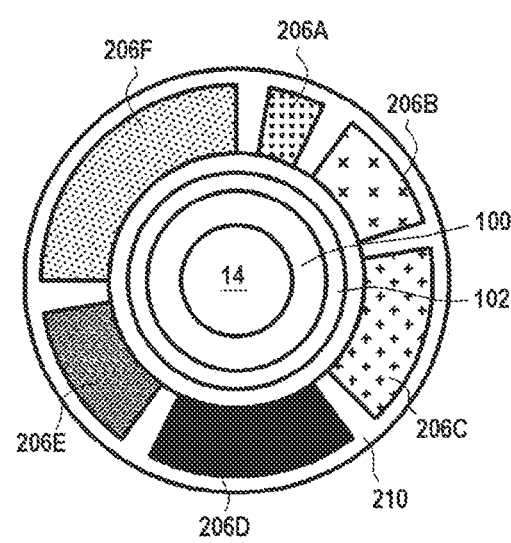
Fig. 4B

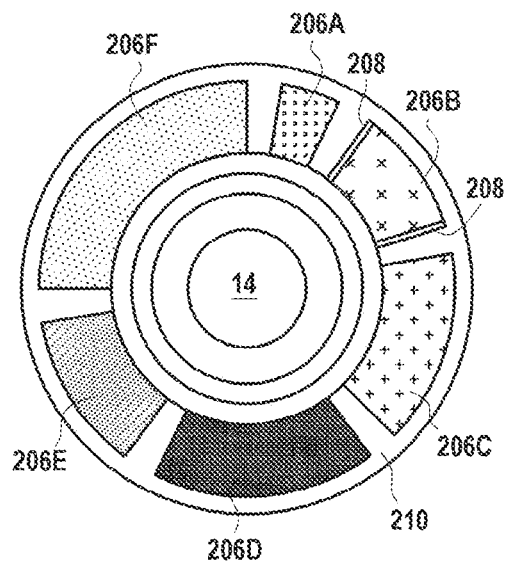
Fig. 5A
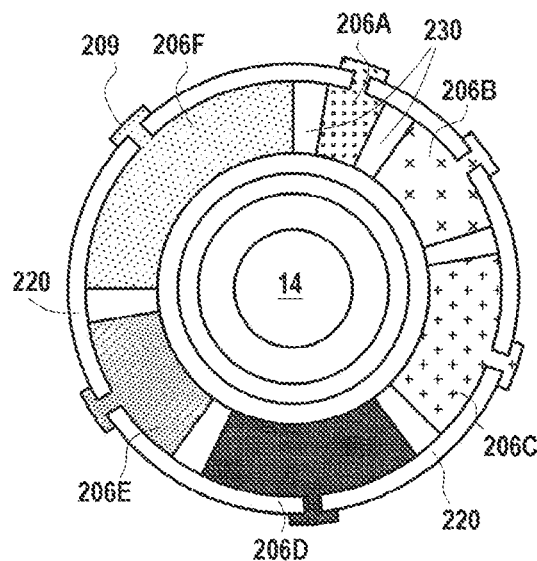
Fig. 5B
[Fig. 6]
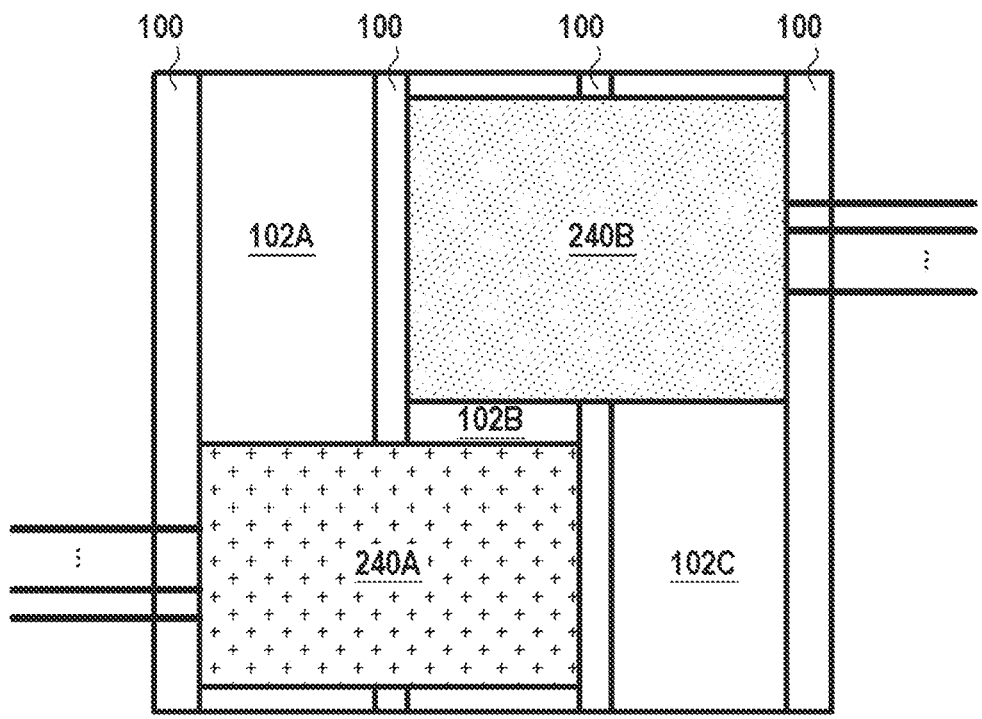

TURBOGENERATOR FOR HYBRID ELECTRIC AERONAUTICAL PROPULSION

CROSS-REFERENCE TO RELATED APPLICATION(S)

This patent application is the U.S. National Stage entry under 35 U.S.C. § 371 of International Patent Application No. PCT/FR2020/051363, filed on Jul. 24, 2020, which claims the benefit of priority to French Patent Application No. 1908503, filed on Jul. 26, 2019.

TECHNICAL FIELD

The present invention relates to the field of hybrid aeronautical propulsion and it relates more particularly to a turbogenerator the electrical generator of which can deliver a plurality of output voltages with distinct power levels.

PRIOR ART

In a conventional turbogenerator, an electrical generator coupled with a heat engine generates an overall power at a given voltage level. This energy is then converted into the different voltage levels required by the electrical loads via power electronics, which has the disadvantage of having high mass, particularly when the voltage conversion ratios are very high, which necessitates resorting to different conversion stages.

These power electronics are also an additional link in the chain of efficiencies and cause a degradation of reliability, causing both an additional need for power to compensate this reduction of efficiency, and a need for additional cooling linked to the thermal nature of the associated losses.

Moreover, conventionally the gas generators of aeronautical turbines are equipped with an electric starter which can operate in generator mode when the turbine is started (with a conventional voltage level of 28 Vdc), the efficiency of which is generally low (approximately 70-75%) and which further has a relatively high mass (approximately 1.5 kg per kW).

But the increasing maturity of hybrid aeronautical propulsion architectures allows the use of electrical loads potentially exploiting different power and voltage levels.

Known with application FR2566975 is an electrical generator with several outputs including a common permanent-magnet rotor and a stator equipped with a plurality of windings allowing in particular the creation of three distinct but not independent three-phased systems.

There further exists today a need to respond to technical challenges posed by these new architectures, both in rationalizing both the generation and electrical conversion devices and in reducing the bulk of these generation and electrical conversion devices, while still improving their efficiency and their reliability.

DISCLOSURE OF THE INVENTION

It is to respond to this necessity that an aeronautical turbogenerator is proposed for hybrid electric propulsion comprising:
  a heat engine
  an electrical generator, coupled mechanically to the heat engine and including a rotor and a stator,
  the rotor extending in an axial direction and including a common magnetized rotor yoke comprising a plurality of permanent magnets defining at least three axially distributed movable annular rings,
  the stator including a magnetic stator yoke comprising a plurality of electrical windings defining axially and/or circumferentially distributed stationary sectors,
  characterized in that at least two stationary sectors, including one covering axially at least two movable annular rings, are arranged angularly so as not to coincide with one another and thus deliver at least two distinct and independent voltage levels.

Thus it is possible to place at the disposal of the electrical loads polyphase alternating electrical networks which are directly usable, while increasing the reliability, the availability and the electrical power, and while reducing bulk.

Preferably, at least one stationary stator sector has axially a dimension that is different from another stationary stator sector.

Advantageously, to a rotor movable annular ring with a determined axial dimension corresponds a stationary stator sector with a different axial dimension.

Preferably, to a rotor movable annular ring is associated both a portion of a first stationary stator sector and a portion of a second stationary stator sector.

Advantageously, the stationary stator sectors are spaced by a simple air gap or by obstacles forming walls.

Depending on the embodiment considered, the stationary stator sectors are even in number and arranged symmetrically on either side of a longitudinal axis of the electrical generator or the stationary stator sectors are arranged asymmetrically relative to a longitudinal axis of the electrical generator.

Preferably, the heat engine is a gas turbine or an internal-combustion engine.

Advantageously, the rotor has one of the following magnetizations: radial, parallel or Halbach type, and the stator has a diametrical or concentric winding.

BRIEF DESCRIPTION OF THE DRAWINGS

Other features and advantages of the present invention will be better revealed by the description given below, with reference to the appended drawings which illustrated non-limiting embodiments of it and in which:

FIG. 1 is a schematic view of an aeronautical turbogenerator,

FIG. 2 shows two half-view in longitudinal section of an aeronautical turbogenerator electrical generator according to the first and second exemplary embodiments of the invention, FIG. 3 shows two half-views in longitudinal section of an aeronautical turbogenerator electrical generator according to the third and fourth exemplary embodiments of the invention, FIGS. 4A-4B show two views in transverse section of an aeronautical turbogenerator electrical generator according to the fifth and sixth exemplary embodiments of the invention, FIGS. 5A-5B show first and second examples of mechanical connection of the windings of the stationary stator sectors of the electrical generator of FIG. 4, and FIG. 6 shows an unrolled view of the tip of an aeronautical turbogenerator electrical generator according to a seventh exemplary embodiment of the invention.

DESCRIPTION OF THE EMBODIMENTS

FIG. 1 illustrates schematically a system for generating electrical power P for an aircraft including an electrical generator 10 coupled mechanically to a heat engine 12 via a drive shaft 14, itself connected to a propellant charge 16 of the aircraft.

In an aircraft, and more particularly an aircraft with hybrid electric propulsion, the heat engine is typically a gas turbine and the assembly formed by this gas turbine and the electrical generator constitutes what it is agreed to call an aeronautical turbogenerator. In certain more specific fields, this heat engine can also be an internal-combustion engine, for example a diesel engine.

The gas turbine conventionally includes a compressor with one or more stages (of the axial or centrifugal type), one or more combustion chambers and a power turbine with one or more stages (of the radial or centrifugal type) which can or cannot include a free turbine. When it includes a free turbine of this type, the free turbine and the generator are mounted on the same drive shaft, concentric with a shaft called high-pressure, supporting the compressor and the power turbine. This shaft then also supports a starter/generator providing the starting of the gas turbine. When the gas turbine is of the linked turbine type, the drive shaft is directly constituted by the high-pressure shaft. Hereafter in the description, the drive shaft 14 can therefore refer either to one or the other of these two gas turbine configurations or even to the output shaft of an internal-combustion engine.

In conformity with the invention and as shown in FIGS. 2 and 3, the electrical generator 10 includes a longitudinal axis XX' which defines an axial direction and a perpendicular radial direction. It comprises a permanent-magnet rotor formed by a common magnetized yoke 100 and by a ring formed from a plurality of permanent magnets 102 with alternate polarity distributed around this common magnetized rotor yoke 100 (see the enlargement associated with this rotor). The rotor is sectorized in the axial direction, in that this ring of magnets is arranged in several successive annular rings (only three annular rings are illustrated for simplifying the drawings) independent of one another and being able to be either of identical dimension, along this axial direction as shown by the three annular rings 102A, 102B, 102C of the upper portion of FIG. 2, or with different dimensions as shown by the three annular rings 102A, 102B, 102C of the lower portion of the same FIG. 2. This plurality of permanent magnets thus defines movable annular rings distributed axially.

This sectorized permanent-magnet rotor is surrounded by one or more stator(s). A stator is formed from a common magnetic stator yoke 200 and from a plurality of windings 202 distributed along this common magnetic stator yoke 200 (see the enlargement associated with this stator).

A stator is configured to deliver, independently from each other, a distinct polyphase voltage level via an electrical connection 204.

This stator is also sectorized in the axial direction, each axial stator sector 202A, 202B, 202C, which can have an identical direction in this direction (see the upper portion of FIG. 2) or not (see the lower portion of FIG. 2), defining axially distributed stationary sectors. The axially distributed stationary stator sectors can have a dimension identical to that of the facing movable axially distributed annular rotor rings, as shown by FIG. 2, or have different dimension as shown by FIG. 3. Thus, on the upper portion of FIG. 3, to three axial annular rotor rings (assume for this example to have the same dimension) correspond two axial stator sectors 202A, 202D and in the lower portion of FIG. 3, to three axial annular rotor rings correspond a single or common stator sector 202E which covers all the portions of the axial annular rotor rings. More generally, the rotor includes at least three movable annular rings and the stator includes at least one stationary axial sector covering at least two movable annular rings.

The magnetization of the magnets 102 of the rotor can be radial, parallel, of the Halbach type or of any other appropriate configuration and the winding 202 of the stator of the diametrical or concentric type.

FIGS. 4A and 4B illustrate two other exemplary embodiments of the invention in which the sectorization of the stator is no longer axial but circumferential, defining at least partly annular stationary sectors, the sectorization of the rotor, for its part, remaining axial. In FIG. 4A, this circumferential sectorization is symmetrical in that the stationary stator sectors 204A-204F are even in number (six in the illustrated example, which cannot be considered limiting) and arranged symmetrically on either side of the longitudinal axis XX' of the electrical generator. In FIG. 4B, this circumferential sectorization is asymmetrical in that the stationary stator sectors 206A-206F, which can be even in number (six as well in the example illustrated) are arranged asymmetrically relative to the longitudinal axis XX' of the electrical generator, i.e. without satisfying any particular symmetry around the rotor. With each sector is associated an electrical connection which allows delivering a particular polyphase voltage level. The stator assemblies formed by the yoke 200, the windings 202 and the electrical connection 204 are supported by the frame 210 of the motor.

As shown schematically by FIGS. 5A and 5B, the mechanical retention of the windings can be provided by obstacles forming walls 208 or external bolting 209. In this second configuration, the frame of the motor is constituted only by an external ring forming a cage 220, the stators being spaced by a simple air gap 230.

Finally, FIG. 6 illustrates a last preferred exemplary embodiment in which on stationary axial stator sector is also sectorized in a circumferential direction. Thus, to a first stator 240A (yoke, winding an electrical connection) which extends over several axial annular rotor rings 102A, 102B succeeds a second stator 240B (yoke, winding an electrical connection) which also extends over several axial annular rotor rings 102B, 102C, a common axial annular rotor ring 102B being surrounded by a sectorized stator to receive both a portion of the first stator 240A and a portion of the second stator 240B.

With the invention, at least two stationary sectors are arranged angularly so as not to coincide with one another and cooperate with at least one movable annular ring to deliver at least two distinct voltage levels independent of one another.

It will be noted that all the architectures previously described allow the generation of N electrical powers with N different levels of polyphase voltage with a single turbogenerator. In addition, the direct mechanical connection to the shaft of the heat engine gives access to high rotation speeds (considered to be high speed), thus allowing minimizing the mass of the electrical generators and, in the case of using a gas turbine of the linked turbine type (single spool), it is possible to eliminate the alternator-starter.

The invention claimed is:

1. A turbogenerator for hybrid electric aeronautical propulsion comprising:
 a heat engine
 an electrical generator mechanically coupled to the heat engine and including a rotor and a stator,
 the rotor extending in an axial direction and including a common magnetized rotor yoke comprising a plurality of permanent magnets defining at least three axially distributed movable annular rings, the stator including a magnetic stator yoke, the rotor being sectorized in the axial direction and comprising a plurality of electrical windings defining axially and/or circumferentially distributed stationary sectors, wherein at least two stationary sectors, including one covering axially at least two movable annular rings, are further arranged angularly so as not to coincide with one another and thus deliver at least two distinct and independent voltage levels.

2. The aeronautical turbogenerator according to claim 1, wherein at least one stationary sector has axially a dimension that is different from another stationary stator sector.

3. The aeronautical turbogenerator according to claim 2, wherein a portion of a first stationary stator sector and a portion of a second stationary stator sector are both associated to a rotor movable annular ring.

4. The aeronautical turbogenerator according to claim 3, wherein the stationary stator sectors are spaced by a simple air gap or by obstacles forming walls.

5. The aeronautical turbogenerator according to claim 1, wherein, to a rotor movable annular ring with a determined axial dimension, corresponds a stationary stator sector with a different axial dimension.

6. The aeronautical turbogenerator according to claim 1, wherein the stationary stator sectors are even in number and arranged symmetrically on either side of a longitudinal axis of the electrical generator.

7. The aeronautical turbogenerator according to claim 1, wherein the stationary stator sectors are arranged asymmetrically relative to a longitudinal axis of the electrical generator.

8. The aeronautical turbogenerator according to claim 1, wherein the heat engine is a gas turbine or an internal-combustion engine.

9. The aeronautical turbogenerator according to claim 1 wherein the rotor has one of the following magnetizations: radial, parallel or Halbach type.

10. The aeronautical turbogenerator according to claim 1, wherein the stator has a diametrical or concentric winding.

* * * * *